April 3, 1928.

J. E. CRADDOCK

AMUSEMENT DEVICE

Filed April 23, 1926    6 Sheets-Sheet 2

1,665,129

J. E. Craddock
INVENTOR

ATTORNEY

WITNESS:

April 3, 1928.

J. E. CRADDOCK

AMUSEMENT DEVICE

Filed April 23, 1926

J. E. CRADDOCK

1,665,129

AMUSEMENT DEVICE

Filed April 23, 1926

J. E. CRADDOCK

AMUSEMENT DEVICE

Filed April 23, 1926

J. E. Craddock INVENTOR

BY Victor J. Evans ATTORNEY

WITNESS:

April 3, 1928. 1,665,129
J. E. CRADDOCK
AMUSEMENT DEVICE
Filed April 23, 1926 6 Sheets-Sheet 6

J. E. Craddock INVENTOR
BY *Victor J. Evans*
ATTORNEY

WITNESS:

Patented Apr. 3, 1928.

1,665,129

UNITED STATES PATENT OFFICE.

JOHN E. CRADDOCK, OF PERRY POINT, MARYLAND.

AMUSEMENT DEVICE.

Application filed April 23, 1926. Serial No. 104,171.

This invention relates to an amusement device, the general object of the invention being to provide a plurality of targets which are adapted to be struck by projectiles thrown at them, with means operated by the target struck for operating registering mechanism which will automatically give the score or sum of all the targets struck by a certain number of projectiles.

Another object of the invention is to give the targets different values, such as by placing different numerals on them and to make the means for actuating the registering mechanism capable of being moved to different degrees according to the target struck so that such registering mechanism will add the sum or value to the score of the particular target which has been struck.

A further object of the invention is to provide means for returning the registering mechanism to zero when a certain number of projectiles have been thrown at the targets and it is desired to reset the device for a new player or to permit the first player to start over again.

Another object of the invention is to provide means for returning the balls or projectiles to the front of the device where they can easily be picked up by the players, with coin controlled means for preventing the balls or projectiles being so picked up until a coin has been dropped into the chute of the coin controlled device.

Another object of the invention is to provide adjustable means for controlling the number of balls or projectiles delivered to the player after a coin has been deposited, with means for preventing the feeding of other balls into the holder while the balls already in the holder are being taken therefrom.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

In these views, 1 indicates a casing which is supported by the legs 2 and 3 indicates a yoke-shaped frame, the lower part of which forms feet. This frame supports a casing 4 which has its top and portion of its front open, and side bars 5 connect the casings together, these side bars being connected with the legs 2 by the braces 6. A plurality of targets are arranged on the front of the casing 1, each target comprising a stem 7 which passes through a bushing 8 in the front of the casing, a head 9 on the outer end of the stem and a coiled spring 10 on the stem for holding the target in projected position. When any of these targets are struck by a ball or projectile, the blow of the projectile on the head of the target will cause the stem to slide through the bushing against the action of its spring, but as soon as the force of the blow is spent, the spring will return the target to normal position.

The targets shown in the drawings are arranged in a circle about a central target, the targets in the row bearing the numeral 50 and the central target the numeral 100, these figures indicating the values of the targets or the sum to be added to the score when the targets are struck. It will, of course, be understood, however, that the targets can be differently arranged and can be given other values. As the stem of the target moves inwardly, it will strike a pin or arm 11 on a rock shaft 12 journaled in the casing so that the shaft will be rocked. The drawings show three of these rock shafts but, of course, the number used will depend on the number of targets. Each shaft carries an arm 13 which is pivoted to a lever 14, the arm 13' of the middle shaft 12' being provided with a twin 13'' for engaging the pivot pin, as this middle shaft is operated by the central target of high value and is moved to a greater extent by said target than are the other shafts. The lever 14 carries a dog 15 adjacent its upper end for engaging the pins 16 projecting from the rear face of a registering disk 17 which is pivotally supported in the casing by having its hub 18 engaging a stub shaft 19 carried by the casing. A coiled spring 20, on the hub and connected with a stationary part of the shaft 19 and with the disk, holds the disk with its projection 21 in engagement with a stop pin 22 carried by the casing. Thus as the lever 14 is moved upwardly by the rocking of one of the rock shafts, its dog 15 will engage a pin and cause the pin to move with it so that the disk is moved one step. A holding dog 25 will then engage the pin which has been raised by the dog 15, and thus hold the disk in its new position and against the tendency of the spring 18 to return it to its normal or zero position.

In order to prevent the disk from being moved more than one step at a time, I provide a check dog 26 for engaging the pins 16, said dog being carried by a lever 27 which is pivoted a distance from one end, as shown at 28, and this lever has a weight 29 connected with the short end, the other end of the lever passing through a slot 30 in the lever 14, so that the lever 27 is moved each time the lever 14 is moved. A spring 31 holds the lever 14 normally in raised position.

Thus it will be seen that when a target is struck by a ball, it will be pushed inwardly by the force of the blow and this inward movement will rock one of the shafts 12, which rocking movement of the shaft will move the lever 14 downwardly against the action of its spring so that the dog 15 will slide over one of the pins 16 of the disk and drop upon the same so that as soon as the target returns to normal position under the action of its spring, the spring 31 will cause the lever 14 to move upwardly again, thus moving the disk one step. As the pin, which is engaged by the dog, reaches the limit of its movement, the holding dog 25 will drop under the same and thus prevent the spring 20 from returning the disk to its starting point, it being understood that the spring is being wound by the step by step movement of the disk. It will also be seen that as the lever 14 is moved downwardly by the movement of a rock shaft, it will rock the lever 27 on its pivot so that the dog 26 on said lever will be moved away from the pins 16 so as to permit the disk to be moved on the upward movement of the lever 14, but on said upward movement of the lever 14, the weight 29 will cause the lever 27 to return to its normal position and thus cause the dog 26 to come into the path of the next pin and thus prevent the disk being moved more than one step.

Figure 12:
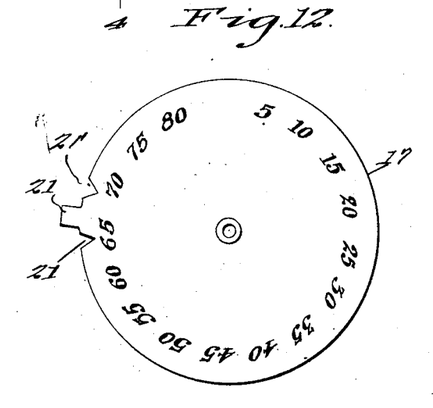
Figure 12 is a face view of the registering disk.
Figure 13:
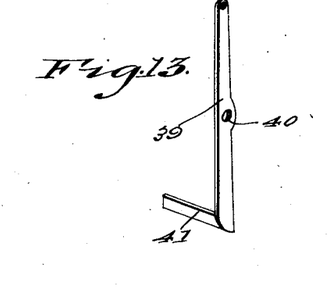
Figure 13 is a view of the L-shaped lever for holding the dogs in inactive position to enable the registering device to be returned to zero by its spring.
Figure 14:
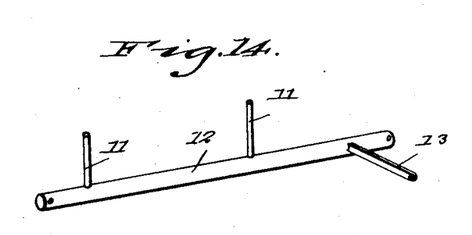
Figure 14 is a view of one of the rock shafts.
Figure 15:
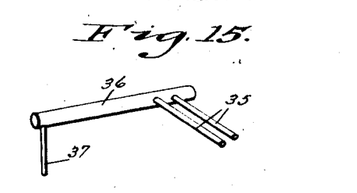
Figure 15 is a view of the rock shaft for limiting the downward movement of the dog carrying lever when the targets carrying the low numbers are struck.
Figure 16:
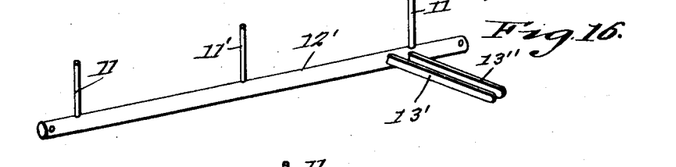
Figures 16 and 17 are views of the other rock shafts.
Figures 17, 18:
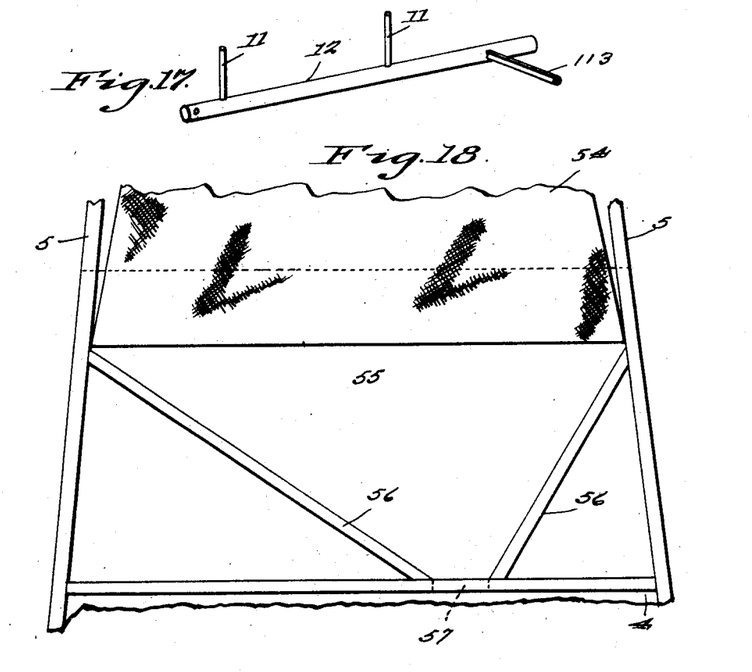
Figure 18 is a fragmentary plan view showing the guide means for directing the balls to the opening leading to the holder, the cover plate being removed.
Figure 19:
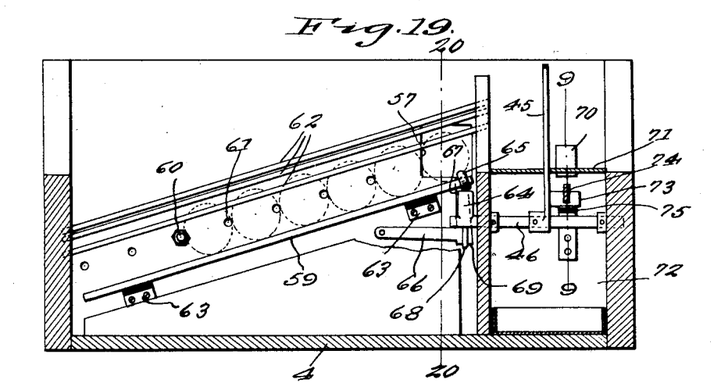
Figure 19 is a fragmentary front view, with parts in section, showing the coin controlled means and the holder.
Figure 20:
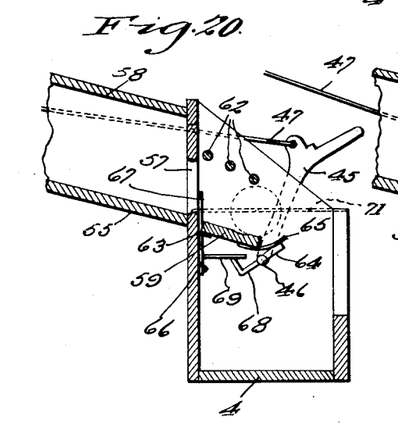
Figure 20 is a section on line 20—20 of Figure 19.
Figure 21:
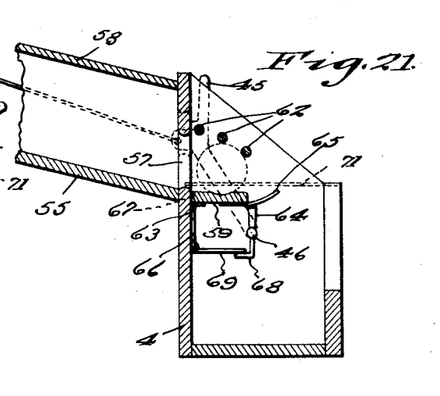
Figure 21 is a similar view, but showing the parts in raised position.
Figure 22:
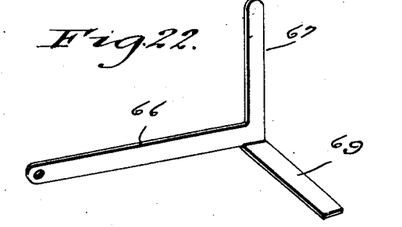
Figure 22 is a view of the device for preventing balls from passing through the opening leading to the holder when the shelf of the holder is lowered.

As the central target is of twice the value or sum of each of the other targets, when this central target is struck, it must move the disk operating means twice the extent which such means are moved by the other targets so as to move the disk two steps at once, it being seen from Figure 12 that the dial on the disk has its numbers multiples of five, the window 32 through which the numerals on the dial appear having a cipher at one side thereof, as shown at 33, which acts as the final cipher to the numbers on the dial. Thus according to the arrangement shown in the drawings, the first number to appear at the window when one of the outer targets is struck, will be 50, then if a second outer target is struck, the disk will be moved one step and 100 will appear at the window. Then if the inner target is struck, the disk will be moved two steps, so that 200 will appear at the window, as 100 will be added to the 100 given by the operation of the first two targets. This double movement of the parts, when the central target is struck, is caused by making the stem of this central target of greater length so that it will move the arm or pin 11' which it engages to a greater extent than the other pins are moved by their targets. Thus the rock shaft 12' will be rocked to a greater extent than the other rock shafts and therefore the twin arms 13' and 13'' will move the lever 14 downwardly until it strikes a stop 34 on the bottom of the casing. This additional movement of the lever 14 will cause the dog 15 to pass one pin and engage the next so that as the parts move upwardly again, the disk will be moved two steps instead of one.

In order to limit the downward movement of the lever 14, when the shafts are rocked by the targets bearing the smaller numbers, I provide stop pins 35 on a small rock shaft 36 which has a pin 37 thereon which is engaged by the stem of the central target, when said target is struck, which moves the stop pins 35 out of the way of a projection 38 on the lever 14 so that the said projection 38 can pass the pins 35 as the lever 14 is being moved downwardly by the operation of the central target. When the other targets are actuated, the rock shaft 36 is not moved so that the pins 35 remain in the path of the projection 38 and thus limits the downward movement of the lever 14 so that its dog 15 can engage but one pin 16 and thus move the disk one step.

After the disk has been moved almost a complete revolution, its projection 21 will strike the pin 22 so that further movement of the disk is prevented and then the parts must be returned to normal position with the disk in its zero position. This is done by the manipulation of an L-shaped lever 39 which is pivoted in the casing, the pivot hole 40 being arranged at the center of the lever. This lever may be pivoted to the same pivot to which the holding dog 25 is pivoted. The short arm 41 of the lever will engage the locking dog 25 and the upper end of the lever 14, when the lever 39 is rocked so as to move both dogs out of the path of the pins which will permit the spring 20 on the hub of the registering disk to return the disk to its normal or zero position. The upper end of the lever 39, when the lever is rocked as just described, will engage a spring 43 at the top of the casing which will hold the lever 39 in position with the part 41 thereof holding the dogs out of engagement with the pins on the disks. This insures the return of the disk to its zero position.

A projection 44 on the upper end of the lever 14 will engage the arm 41 of the lever 39 when said lever 14 is moved downwardly and push said lever 39 back to its normal position, so that when the parts are moved downwardly by a target being struck by a projectile, the lever 39 will be moved inwardly out of engagement with the spring 43 so that the dogs will return to their normal position, for engaging the pins 16 of the disks during the operation of the device. By this arrangement, the device can be reset by manipulating the lever 39 and then as soon as a target is struck, the said lever will be returned to its normal position.

A lever 45 is fastened to a rock shaft 46 in the casing 4 and a cable 47 has one end connected with said lever and its other end to the vertical arm of the lever 39 so that when said lever 45 is pulled outwardly, the cable will exert a pull upon the lever 39 and move it to a position where the projection 41 will move the dogs to inactive position and the lever will be engaged and held in this position by the spring member 43. The cable passes over suitable guiding pulleys, as shown at 48 and a spring 49 in the casing is connected with a portion of the cable so as to cause the same to hold the lever 45 in its inner position.

The player stands in front of the frame 3 and throws the balls or projectiles at the targets so that the lever 45 is within his reach so that he can reset the device after it has completed the score or made a full revolution.

In order to prevent the balls from being caught between the targets, I place pads 50 on that portion of the casing which carries the targets, these pads filling the spaces between the targets but exposing the heads so that a ball can strike the head. These pads are held in position by a ring 51 which is held to the casing by the clips 52 and this ring also holds in place the inner end of a netting 53 and its cloth bottom 54. The netting is connected with the frame 3 and the cloth bottom 54 is connected to the upper end of a platform 55 which is connected with the side bars 5. Guiding partitions 56 are arranged on the platform for guiding the balls running down the cloth or canvas 54 upon the platform to a hole 57 made in the rear part of the casing 4, so that the balls will be directed into the casing. A plate 58 covers the platform and its guides. The balls, passing through the hole 57, will pass upon an inclined shelf 59 in the casing 4. The balls will run down the shelf until the first one strikes the stop pin 60 which can be adjusted along the length of the shelf by being placed in any one of a number of holes 61 formed in the rear part of the casing 4. Thus the shelf can be adjusted to hold different numbers of balls. The balls are held on the shelf by the bars 62 which also prevent the balls from being taken from the shelf. When the balls are to be taken from the shelf, the shelf is tilted as it is hinged to the rear of the casing 4 by the hinges 63 so that the balls will roll therefrom into the bottom of the casing 4 from which they can be picked up through the opening in the front of the casing. The shelf is tilted by the operation of the lever 45 as the shaft 46 has a projection 64 thereon which engages a curved projection 65 on one end of the shelf. Thus as the shaft is rocked by its lever 45, the projection moves under the curved part of the projection 65 so that the shelf can tilt downwardly until the balls can pass under the lower bar 62 and thus roll off the shelf into the casing.

I also provide means for preventing balls from dropping upon the shelf through the opening 57 when the shelf is being tilted and such means consists of a two arm lever 66 pivoted to the rear of the casing and having one of its arms 67 adapted to extend up across the opening when the shaft 46 is rocked by its lever 45, as said shaft has an L-shaped projection 68 thereon which will engage an arm 69 on the lever 66 when the shaft is rocked, which raises the lever and places the arm 67 in front of the opening, so that this arm will prevent balls from passing through the opening under the shelf. As soon as the lever is returned to its normal position, however, the lever 66 will drop and thus its arm 67 will pass below the opening so that balls can pass through the same upon the shelf.

A spring curved part 14' is formed on the lever 14 which will take the rebound off the ratchet means when the lever 14 is forced down by a target being struck with considerable force. The targets are held against turning movement by each having a pin 7' carried by its bushing 8 which may either engage a slot in the stem of the target or the inner end of the stem may be made of semi-circular shape with the pin engaging the flat edges thereof. The pins 16 are preferably connected with the disks 17 by means of the nuts 16' engaging threaded portions of the pins, one nut of each pin being arranged on one side of the disk and the other nut on the opposite side thereof. Said disk is also provided with the notches 21', one on each side of the projection 21 so as to balance the disks. The part 58 is made in two sections which are hingedly connected together and this part is hinged to the casing 4 so that it can be used as a cover for the casing, one part covering the top of the casing and the other part covering the front thereof. In this way the cover can be locked so that access to the casing is prevented.

Figure 1:
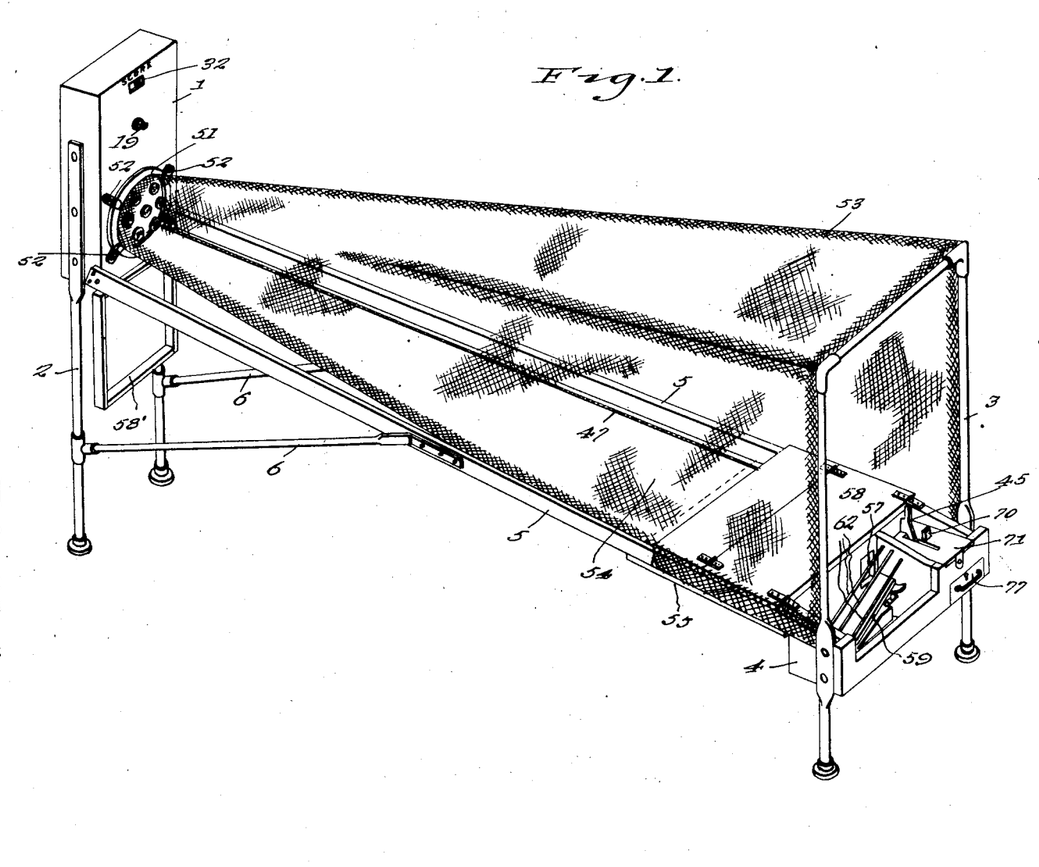
Figure 1 is a perspective view of the device.
Figure 2:
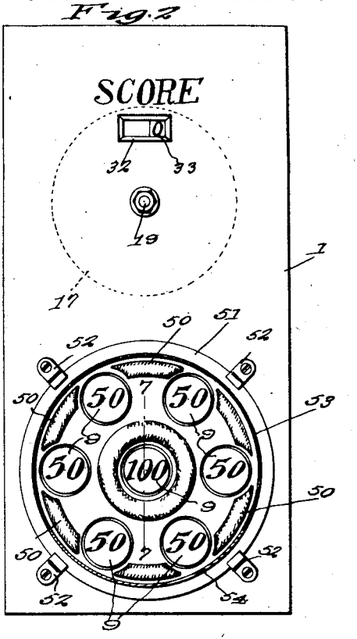
Figure 2 is a front view of the target carrying casing.
Figure 3:
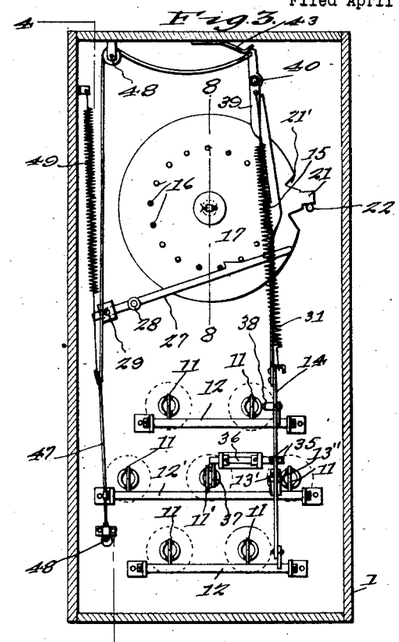
Figure 3 is a section on line 3—3 of Figure 4.
Figure 4:
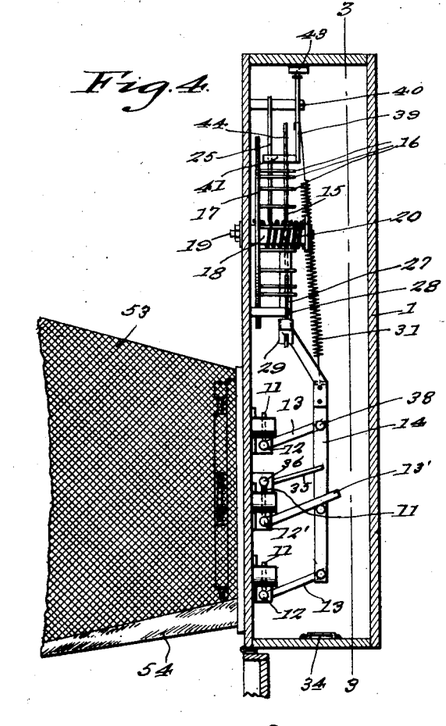
Figure 4 is a section on line 4—4 of Figure 3.
Figure 5:
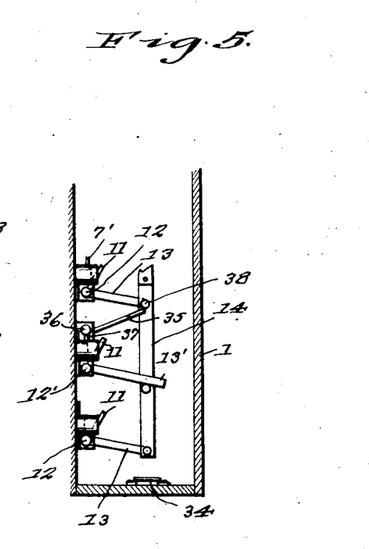
Figure 5 is a view similar to Figure 4, but only showing the lower part of the casing and showing the parts in a different position.
Figure 6:
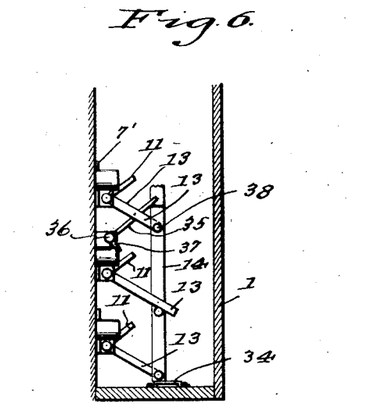
Figure 6 is a view similar to Figure 5, but showing the parts in still another position.
Figure 7:
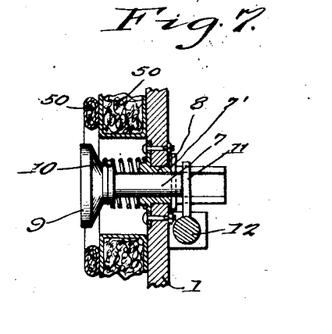
Figure 7 is a section on line 7—7 of Figure 2.
Figures 8, 9, 10, 11:
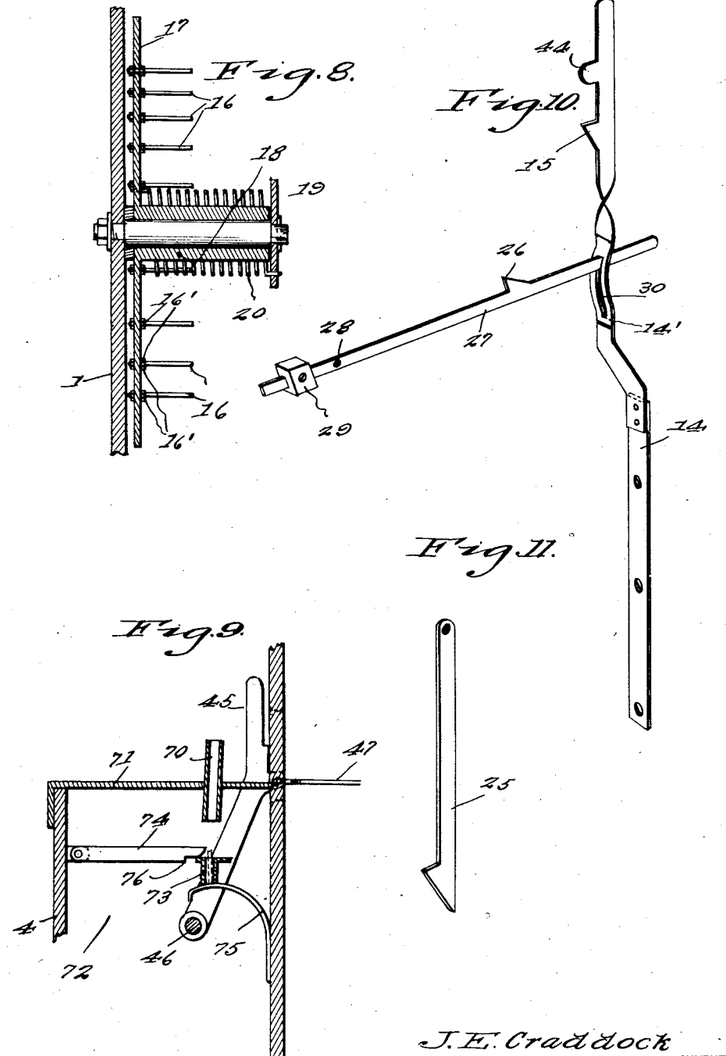
Figure 8 is a section on line 8—8 of Figure 3.
Figure 9 is a section on line 9—9 of Figure 19.
Figure 10 is a view of the dog carrying lever for operating the registering disks and also showing the cross lever which carries the check dog.
Figure 11 is a view of the holding dog.

I may also provide a cover 58' which is hinged to the casing 1 and is arranged to be swung up into engagement with the front of the case to enclose the targets and the netting 53 when the same has been loosened from the frame 3 and placed against the casing 1. Thus the netting and the targets will be protected by this cover when the same is in position. When the device is being used, the cover hangs from the casing 1, as shown in Figure 1. Locks could be placed on these parts and on the rear of the casing 1 to protect the parts against theft.

I also provide means for preventing the projectiles or balls being taken from the holder or rack until a coin of suitable denomination is deposited in a coin chute 70 which is carried by a slotted cover 71 of a coin chamber 72 formed in the casing 4. The lever 45 operates in the slot in the cover 71 and the shaft 46 is journaled in the chamber, with one end projecting therefrom. A coin holder 73 is associated with the lever 45 in such a manner that a latch bar 74 will engage a portion of the holder and thus hold the lever 45 and the shaft 46 against movement. The holder is located under the chute so that a coin dropped through the chute will fall into the holder and be retained therein by a member 75 carried by a stationary part of the device. When the lever is pulled forwardly with a coin in the holder, the coin will strike a beveled edge of the latch lever, thus raising the same to a position where the shoulder 76 on the lever will be raised above the holder so that the holder can pass under the lever and thus permit the lever 45 and shaft 46 to complete their movement. After the parts have moved to a certain extent, the holder 73 will pass beyond the member 75 so that the coin can drop from the holder into a suitable drawer or the like.

It will, of course, be understood that any type of coin controlled mechanism can be used for controlling the movement of the lever 45, the means shown being simply used as one example.

A person wishing to use the apparatus would first drop the proper coin in the coin slot, which would free the lever 45. The player would then pull the lever toward him, which would reset the registering mechanism and return the registering disk to zero and at the same time the shelf will be tilted to throw the balls thereon into the casing, where the player can have access to them. The player would then throw the balls at the targets, the netting preventing wildly thrown balls from being lost, and the balls caught by the netting and those striking the targets or the cushions around the targets will drop upon the canvas bottom and roll down the same upon the platform where they will be guided to the opening 16 which leads to the shelf. The number of balls rolling down upon the shelf can be regulated by the stop pin 60, so that any desired number of balls can be furnished to each player as the owner of the device wishes. As before stated, the tilting of the shelf by the rock shaft will move up the cut-off means to prevent other balls from rolling upon the shelf when the same is tilted. When one of the outer targets is struck, it will move inwardly, thus moving the lever 14 upwardly under the action of a rock shaft so as to rotate the disk one step, which will indicate at the window the value or amount of the target struck. When the middle target is struck, the disk will be moved two steps as before described, so that twice the amount of the other targets will be added to the score. Thus the combined amounts on the targets struck will appear at the window, so that the player can see the score made by throwing all the projectiles taken from the shelf at the targets. The next player, or the same player, will then deposit another coin and operate the lever 45 to reset the device and to receive another set of balls.

I prefer to make the targets of a higher value smaller in size than the targets of the small value.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An amusement device comprising a frame, a casing at the rear end thereof, scoring mechanism carried by the casing, movable targets carried by the casing, means actuated by the movement of the targets for operating the scoring mechanism, an open casing at the front of the frame having an opening in its rear part, means for causing projectiles thrown at the targets to pass through the opening, a tiltable inclined shelf in the open casing for receiving the projectiles passing through the opening, bars for holding the projectiles on the shelf, an adjustable stop associated with the shelf for limiting the number of projectiles occupying the same, a hand lever, means operated thereby for tilting the shelf, means associated with the last mentioned means for preventing projectiles from passing through the opening when the shelf is in tilted position, and means actuated by said lever for returning the scoring mechanism to zero position.

2. An amusement device comprising a target carrying casing, a ball holding casing, means for causing balls thrown at the targets to return to the second casing under the action of gravity, a tiltable shelf in the second casing for receiving the balls passing into the same, bars arranged above the shelf for preventing the balls from being removed from the shelf and means for tilting the shelf to free the balls.

3. An amusement device comprising a target carrying casing, a ball holding casing, means for causing balls thrown at the targets to return to the second casing under the action of gravity, a tiltable shelf in the second casing for receiving the balls passing into the same, bars arranged above the shelf for preventing the balls from being removed from the shelf, a lever for tilting the shelf to free the balls and means operated by the lever for preventing other balls from rolling on the shelf when the same is in tilted position.

4. An amusement device comprising a target carrying casing, a ball holding casing, means for causing balls thrown at the targets to return to the second casing under the action of gravity, a tiltable shelf in the second casing for receiving the balls passing into the same, bars arranged above the shelf for preventing the balls from being removed from the shelf, a lever for tilting the shelf to free the balls, means operated by the lever for preventing other balls from rolling on the shelf when the same is in tilted position and a pin adjustable lengthwise of the shelf for limiting the number of balls occupying the shelf.

In testimony whereof I affix my signature.

JOHN E. CRADDOCK.